United States Patent [19]
Lin

[11] Patent Number: 6,098,226
[45] Date of Patent: Aug. 8, 2000

[54] TOOL COMBINATION FOR WOOD WORK

[76] Inventor: Ching Chou Lin, No. 150, Sec. 3, Chung San Road, Wu Zh Hsiang, Taichung Hsien, Taiwan

[21] Appl. No.: 09/152,660

[22] Filed: Sep. 14, 1998

[51] Int. Cl.[7] .................................................. B25B 15/00
[52] U.S. Cl. .................................................. 7/165; 7/163
[58] Field of Search .............................. 7/158, 163, 165, 7/138; 81/63.2, 63

[56] References Cited

U.S. PATENT DOCUMENTS

| 344,160 | 6/1886 | Brownson | 81/58.4 |
|---|---|---|---|
| 1,563,178 | 11/1925 | Fegley et al. | 81/63.2 |
| 1,712,196 | 5/1929 | Burger et al. | 81/451 |
| 2,304,271 | 12/1942 | Merriman et al. | 81/125 |
| 3,739,825 | 6/1973 | Knox | 81/451 |
| 3,901,298 | 8/1975 | Eby | 81/125 |
| 4,736,658 | 4/1988 | Jore | 81/451 |
| 4,787,278 | 11/1988 | Bononi | 81/452 |
| 5,211,086 | 5/1993 | Shu | 81/58.4 |
| 5,351,586 | 10/1994 | Habermehl et al. | 81/451 |

FOREIGN PATENT DOCUMENTS

| 2704170 | 10/1994 | France | 81/452 |
|---|---|---|---|
| 619794 | 3/1949 | United Kingdom | 81/458 |

*Primary Examiner*—David A. Scherbel
*Assistant Examiner*—Daniel Shanley
*Attorney, Agent, or Firm*—Charles E Baxley, Esq.

[57] ABSTRACT

A tool includes a driving stem having a rear portion received in the front portion of a handle. A ratchet mechanism is disposed in the handle and is engaged with the driving stem for controlling the driving direction of the driving stem. A hand grip is detachably secured to the rear portion of the handle for receiving a tape and a knife. A holder is slidably received in the handle for holding the knife. The tape and the knife and the driving stem are provided for wood working purposes.

9 Claims, 6 Drawing Sheets

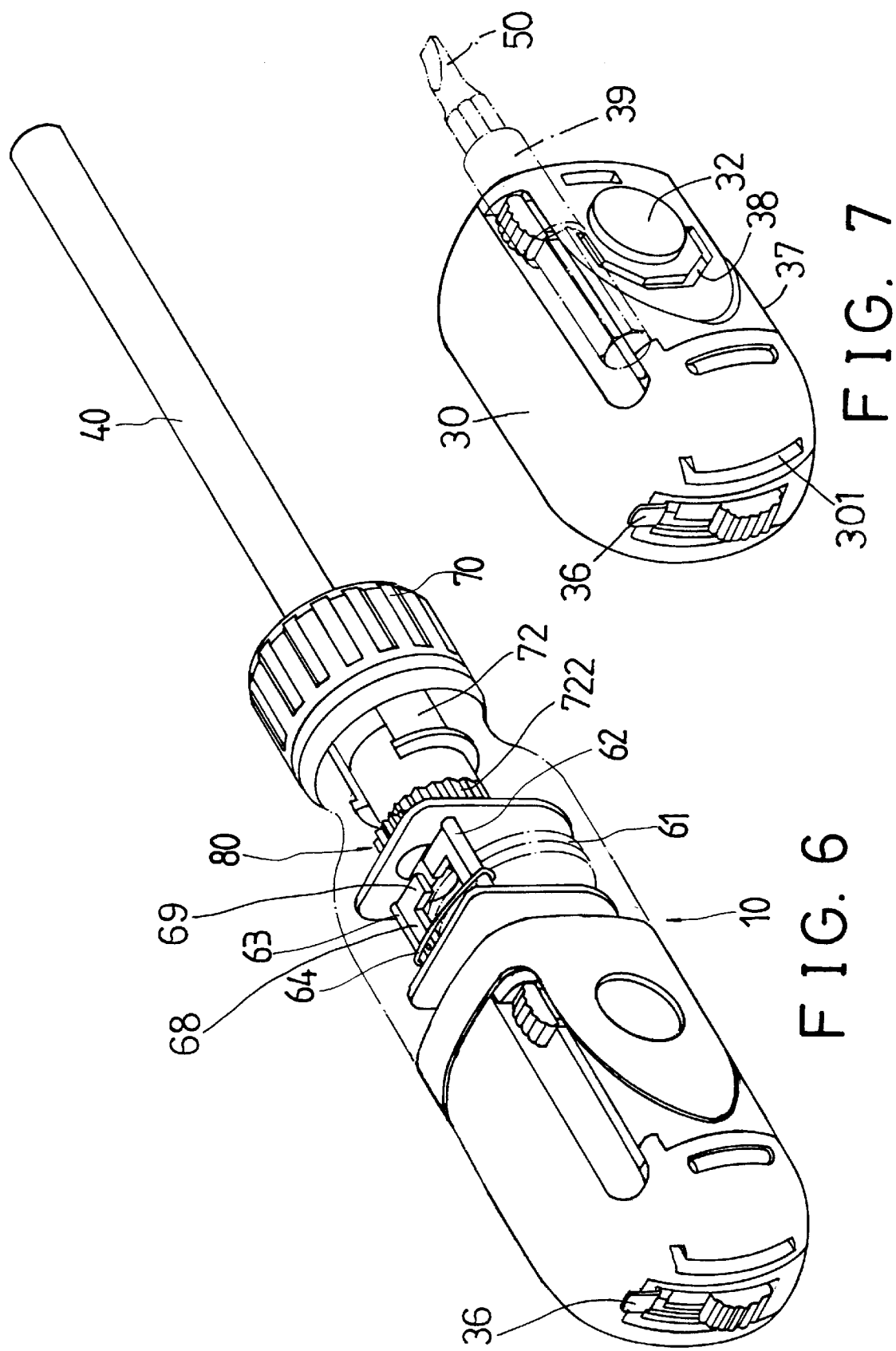

TOOL COMBINATION FOR WOOD WORK

BACKGROUND OF THE INVENTION

1. Field of the Invention

The present invention relates to a tool, and more particularly to a tool combination for wood work.

2. Description of the Prior Art

Typical tools for wood work comprise at least a screw driver, a knife and a reel tape. The users have to prepare at least the three tools for working purposes. None of the typical tools suggest to combine all of the tools together.

The present invention has arisen to mitigate and/or obviate the afore-described disadvantages of the conventional tools.

SUMMARY OF THE INVENTION

The primary objective of the present invention is to provide a tool including a tape and a knife and a driving member for wood working purposes.

In accordance with one aspect of the invention, there is provided a tool combination comprising a handle including a front portion and a rear portion, a driving stem including a first end engaged in the front portion of the handle, a ratchet means for controlling a driving direction of the driving stem, a hand grip detachably secured to the rear portion of the handle, a tape received in the hand grip, a knife slidably received in the hand grip, and means for actuating the knife inward and outward of the hand grip.

The hand grip includes a channel formed therein, and a holder slidably received in the channel for holding the knife, the holder includes a button extended outward of the hand grip for allowing the knife to be moved inward and outward of the hand grip.

The handle includes a pair of flanges extended rearward from the rear portion of the handle, the hand grip includes a pair of protrusions extended laterally therefrom for engaging with the flanges respectively and for allowing the hand grip to be secured to the handle. The hand grip includes two sides each having a recess formed therein for receiving the flanges respectively and for allowing the hand grip to be solidly secured to the handle. The hand grip includes a pair of curved grooves formed around the protrusions respectively for increasing a resilience of the protrusions.

The ratchet means includes at least one gear engaged with the driving stem and rotated in concert with the driving stem, a pair of pawls rotatably secured in the handle and each including a pawl member for engaging with the gear, and means for selectively actuating the pawl members of the pawls to engage with the gear. The ratchet means includes a knob rotatably supported in the handle and having an actuator for selectively engaging with the pawls and for selectively disengaging the pawl members of the pawls from the gear. The ratchet means includes a control ferrule rotatably secured to the front portion of the handle and coupled to the knob for actuating the knob.

Further objectives and advantages of the present invention will become apparent from a careful reading of a detailed description provided hereinbelow, with appropriate reference to accompanying drawings.

BRIEF DESCRIPTION OF THE DRAWINGS

FIG. 6 is a perspective view of the tool, in which a portion of the handle is removed for illustrating the operation of the ratchet mechanism, and FIG. 7 is a perspective view illustrating the application of the tool.

DETAILED DESCRIPTION OF THE PREFERRED EMBODIMENT

Figure 1:
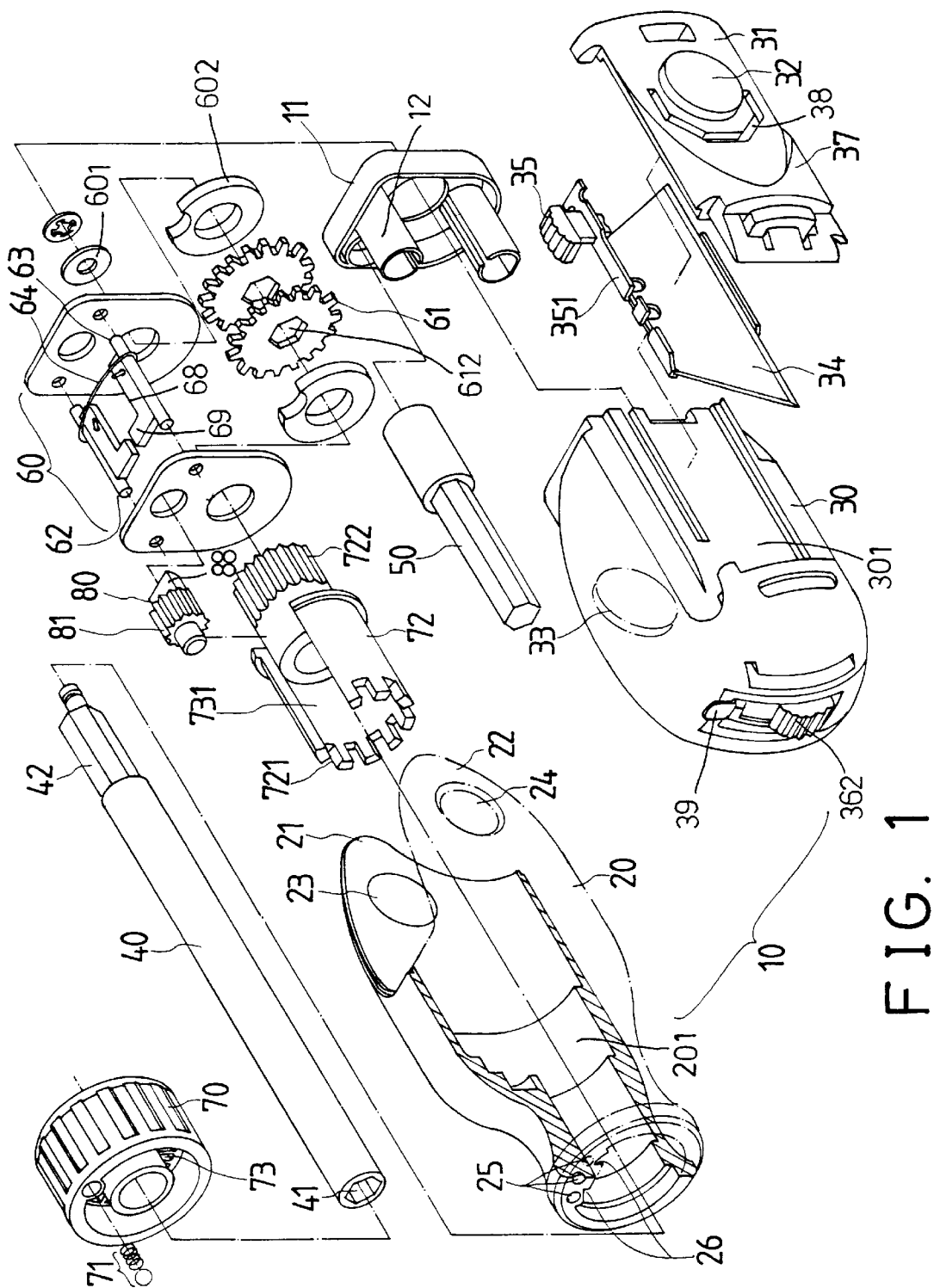
FIG. 1 is an exploded view of a tool combination in accordance with the present invention.
Figure 2:
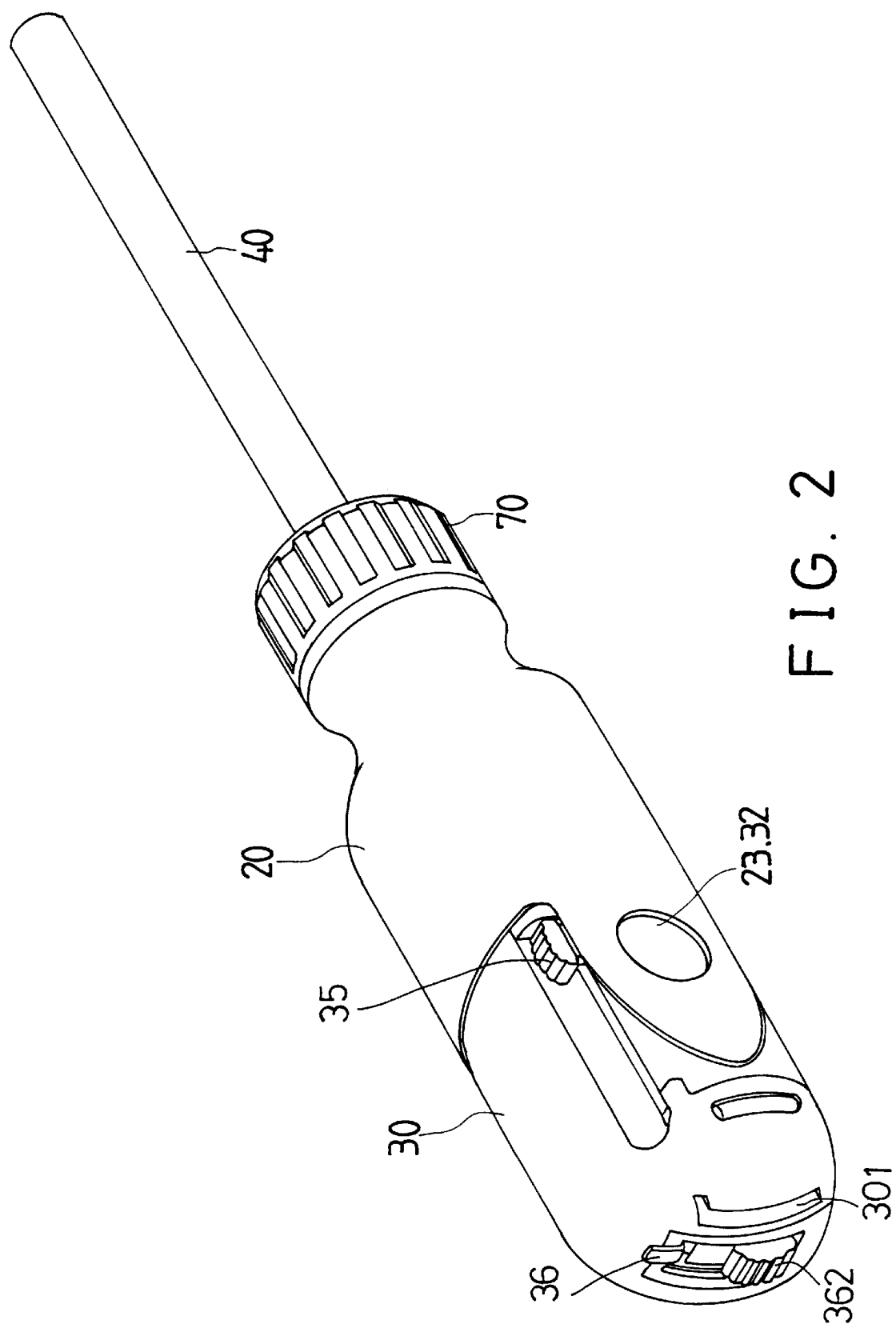
FIG. 2 is a perspective view of the tool.
Figure 5:
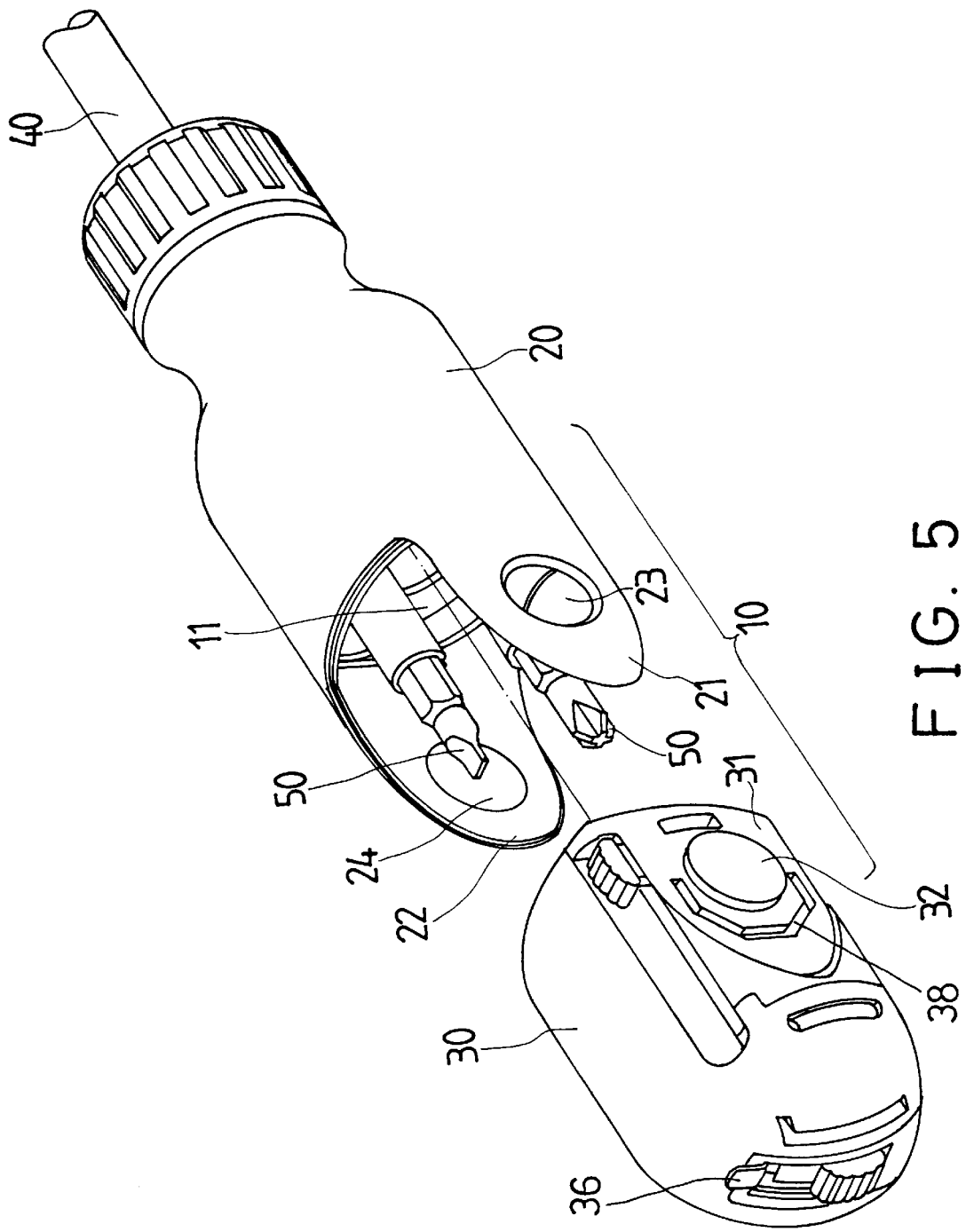
FIG. 5 is a partial exploded view illustrating the operation of the tool.

Referring to the drawings, and initially to FIGS. 1 and 2, a tool combination in accordance with the present invention comprises a handle assembly 10 including a handle 20 and a hand grip 30. The handle 20 includes a chamber 201 formed therein for receiving a holder 11 which includes one or more sockets 12 for receiving tool hits or tool extensions 50 (FIGS. 1, 5). The handle 20 includes a pair of flanges 21, 22 extended rearward therefrom and each having a hole 23, 24 formed therein, and includes a front portion having three cavities 25 formed therein and having a stop 26 extended radially inward therefrom. A control ferrule 70 is rotatably secured to the front portion of the handle 20 by such as a clamping ring and includes a spring-biased projection 71 for engaging with either of the three cavities 25 of the handle 20 and for positioning the control ferrule 70 relative to the handle 20. The control ferrule 70 includes one or more depressions 73 formed therein. A barrel 72 is rotatably received in the handle 20 and includes one or more teeth 721 extended forward therefrom for engaging with the depressions 73 of the control ferrule 70 and for allowing the barrel 72 to be rotated by the control ferrule 70. The barrel 72 includes a notch 731 for receiving the stop 26 which may limit the rotational movement of the barrel 72 and thus the control ferrule 70 relative to the handle 20. The barrel 72 includes a pinion 722 extended rearward therefrom.

A ratchet mechanism 60 includes one or more gears 61 disposed between two plates 601 and two washers 602, and two pawls 62, 63 rotatably secured between the plates 601. A pawl 80 is rotatably secured to one of the plates 601 and is preferably supported in place by the washer 602 and includes a pinion 81 engaged with the pinion 722 of the barrel 72 and for allowing the pawl 80 to be rotated by the control ferrule 70 via the barrel 72. The pawl 80 includes an actuator 88 extended away from the control ferrule 70. The pawls 62, 63 each includes a pawl member 68 for engaging with the gear 61 and each includes an extension 69 for engaging with the actuator 88 and for allowing the actuator 88 to disengage either of the pawl members 68 from the gear 61 (FIGS. 1, 6). A spring 64 is engaged with the pawls 62, 63 for biasing the pawl members 68 to engage with the gear 61. One or both of the gears 61 include an engaging hole 612 which preferably includes a hexagonal cross section for engaging with a stud 42 of a driving stem 40 and for allowing the driving stem 40 to be rotated in concert with the gear 61. The driving stem 40 includes an engaging hole 41 formed in the other end for engaging with the fasteners Or the tool extensions. The driving stem may include a telescopic structure for extending the length of the driving stem.

Figure 3:
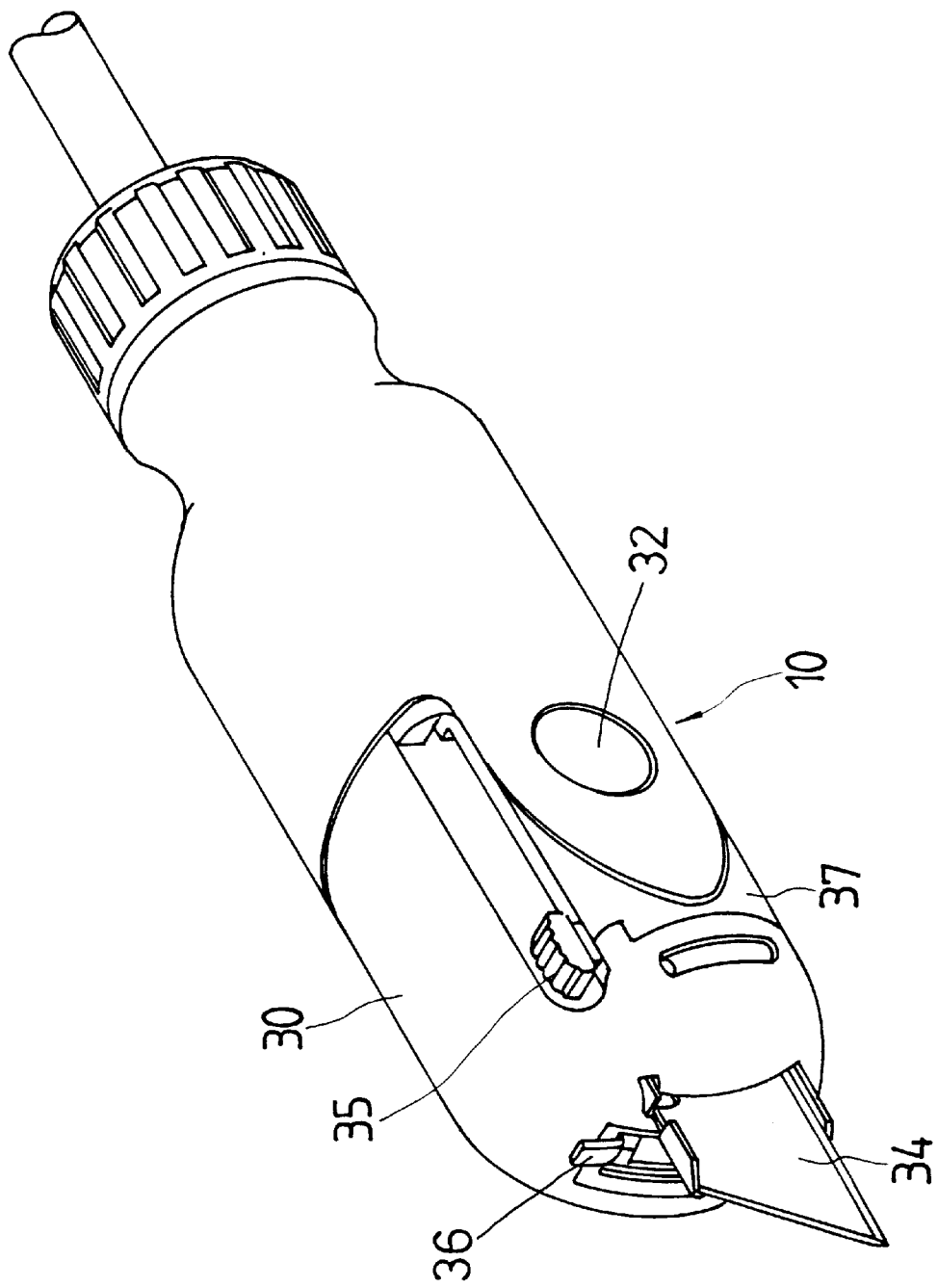
FIGS. 3 and 4 are perspective views illustrating the operation of the tool.
Figure 4:
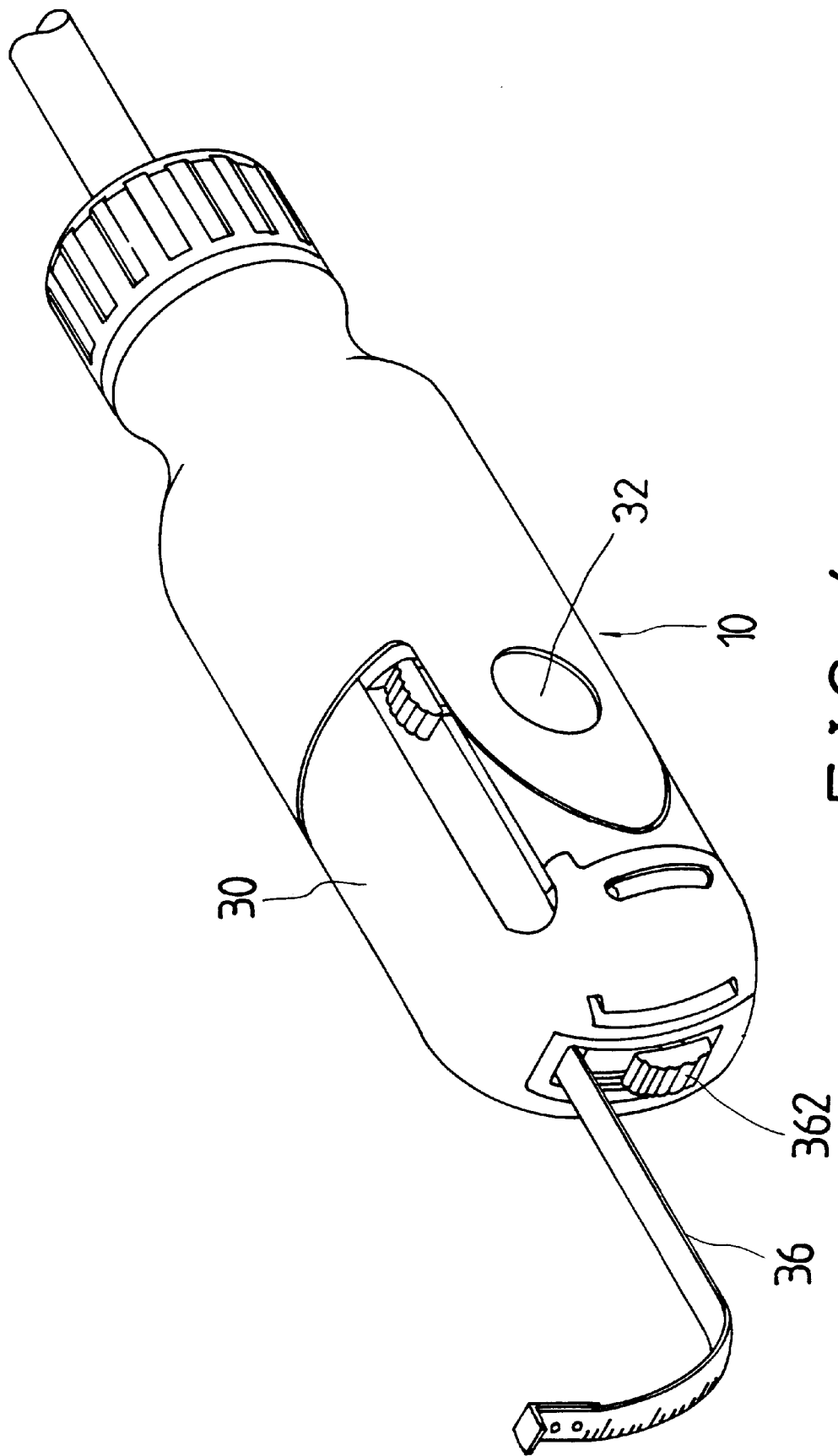

The hand grip 30 includes a pair of extensions 32 laterally extended outward for engaging in the holes 23, 24 of the flanges 21, 22 of the handle 20 and includes a pair of curved grooves 38 formed around the extensions 32 for increasing the resilience of the extensions 32 and for allowing the extensions 32 to be easily engaged through the flanges 21, 22 and to engage in the holes 23, 24. The extensions 32 may also be easily depressed inward of the hand grip 30 for allowing the hand grip 30 to be easily disengaged from the handle 20. The hand grip 30 includes a pair of recesses 31 having a shape corresponding to that of the flanges 21, 22 for allowing the hand grip 30 to be solidly secured to the handle 20. As shown in FIG. 4, a reel tape 36 is received in the hand grip 30 and a lock 362 is provided to lock the tape 36 relative to the hand grip 30. The hand grip 30 includes a channel 301 formed therein for slidably receiving a holder 351 of a knife blade 34. The holder 351 has a button 35 extended outward of the hand grip 30 for allowing the knife blade 34 to be actuated inward and outward of the hand grip 30 (FIG. 3). A cap 37 may be attached to the hand grip 30 for retaining the knife holder 351 in place. As shown in FIG. 7, In operation, when both of the pawls 62, 63 are engaged with the gear 61, the driving stem 40 may be driven in both the active direction and the reverse direction by the handle 10. When one of the pawls 62, 63 is disengaged from the gears 61 by the actuator 88 when the knob 80 is rotated by the control ferrule 70, the driving stem 40 may thus be driven in either the active direction or the reverse direction only by the handle 10.

Accordingly, the tool combination in accordance with the present invention includes a tape and a knife and a driving member for wood working purposes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tool combination comprising:
    a) a handle including a front portion and a rear portion;
    b) a driving stem including a first end engaged in said front portion of said handle;
    c) a hand grip detachably secured to said rear portion of said handle;
    d) a tape received in said hand grip;
    e) a knife slidably received in said hand grip;
    f) means for actuating said knife inward and outward of said hand grip; and
    g) a ratchet mechanism for controlling a driving direction of said driving stem, said ratchet mechanism including:
        i) at least one gear engaged with said driving stem and rotated in concert with said driving stem;
        ii) a pair of pawls rotatably secured in said handle and each including a pawl member for engaging with said at least one gear; and
        iii) means for selectively actuating said pawl members of said pawls to engage with said at least one gear.

2. The tool according to claim 1, wherein said ratchet mechanism includes a second pawl rotatably supported in said handle and having an actuator for selectively engaging with and disengaging said pawl members of said pawls from said at least one gear.

3. The tool according to claim 2, wherein said ratchet mechanism includes a control ferrule rotatably secured to said front portion of said handle and coupled to said second pawl for actuating said second pawl.

4. The tool according to claim 3, wherein said ratchet mechanism includes a barrel having a first end secured to said control ferrule and having a first pinion provided on a second end thereof, said second pawl includes a second pinion engaged with said first pinion of said barrel for allowing said control ferrule to rotate and actuate said second pawl via said barrel and said first and said second pinions.

5. The tool according to claim 4, wherein said control ferrule includes at least one depression formed therein, said barrel includes at least one tooth extended from said first end thereof and engaged into said at least one depression of said control ferrule for securing said barrel to said control ferrule.

6. The tool according to claim 1, wherein said hand grip includes a channel formed therein, and a holder slidably received in said channel for holding said knife, said holder includes a button extended outward of said hand grip for allowing said knife to be moved inward and outward of said hand grip.

7. The tool according to claim 1, wherein said handle includes a pair of flanges extended rearward from said rear portion of said handle, said hand grip includes a pair of protrusions extended laterally therefrom for engaging with said flanges respectively and for allowing said hand grip to be secured to said handle.

8. The tool according to claim 7, wherein said hand grip includes two sides each having a recess formed therein for receiving said flanges respectively and for allowing said hand grip to be solidly secured to said handle.

9. The tool according to claim 7, wherein said hand grip includes a pair of curved grooves formed around said protrusions respectively for increasing a resilience of said protrusions.

\* \* \* \* \*